Sept. 28, 1965   C. W. THORNTHWAITE ETAL   3,208,275
MEASUREMENT OF VERTICAL WIND AND CLIMATOLOGICAL FLUX
Filed May 9, 1961                    4 Sheets-Sheet 1

C. W. THORNTHWAITE &
W. J. SUPERIOR
INVENTORS,

BY

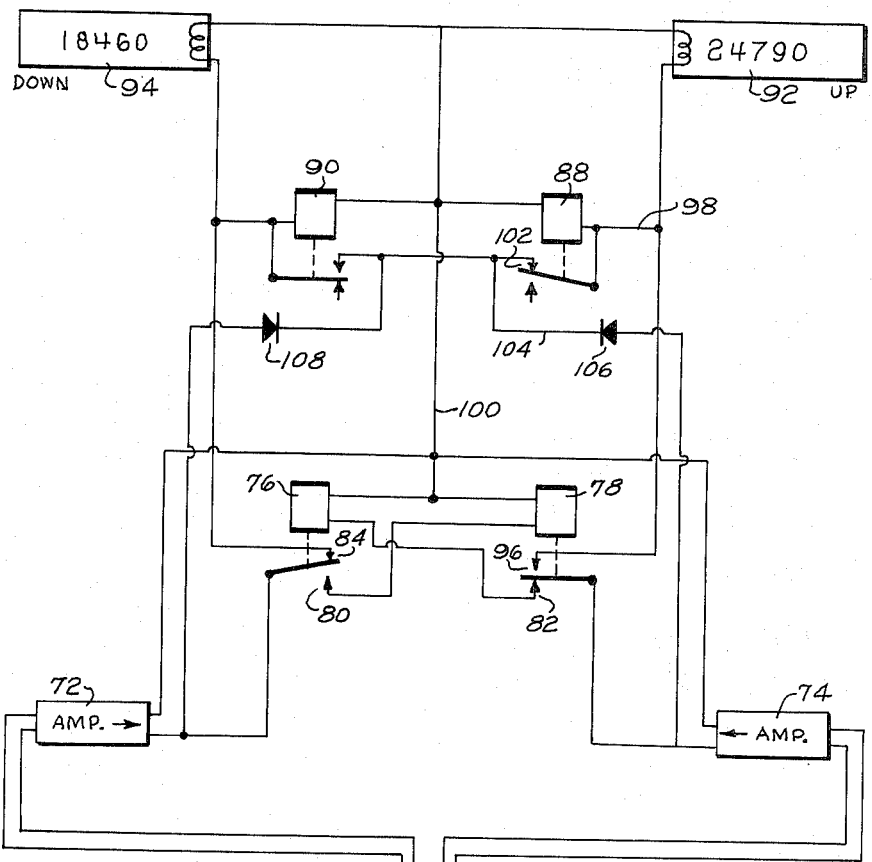
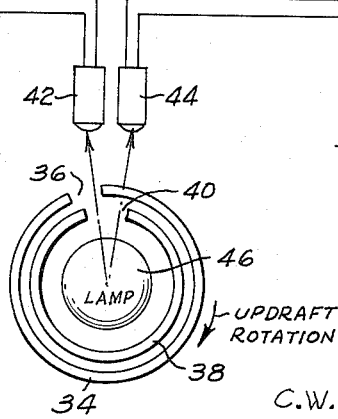
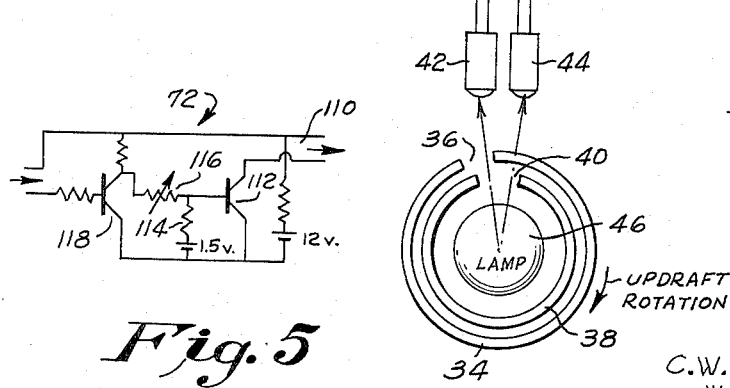
Fig. 4
Fig. 5
C. W. THORNTHWAITE &
W. J. SUPERIOR
INVENTORS, Sept. 28, 1965  C. W. THORNTHWAITE ETAL  3,208,275
MEASUREMENT OF VERTICAL WIND AND CLIMATOLOGICAL FLUX
Filed May 9, 1961  4 Sheets-Sheet 3
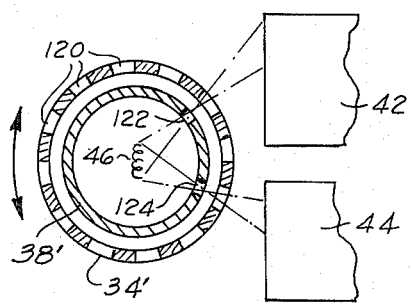
Fig. 6
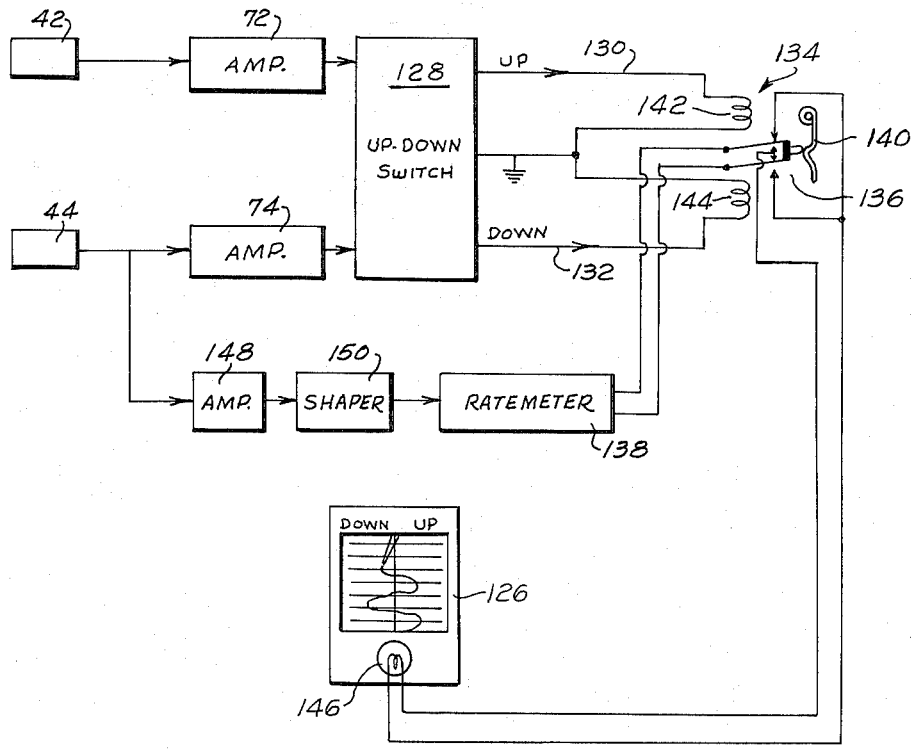
Fig. 7
C. W. THORNTHWAITE &
W. J. SUPERIOR
INVENTORS,
BY United States Patent Office 3,208,275
Patented Sept. 28, 1965

3,208,275
MEASUREMENT OF VERTICAL WIND AND CLIMATOLOGICAL FLUX
Charles Warren Thornthwaite, Elmer, and William John Superior, Seabrook, N.J., assignors to C. W. Thornthwaite Associates, Elmer, N.J., a corporation of New Jersey
Filed May 9, 1961, Ser. No. 108,908
5 Claims. (Cl. 73—170)

This invention pertains to meteorological and climatological measurements, and especially to ways and means for measuring or recording the vertical components of air flow and the vertical "flux" of significant quantities such as heat, moisture, air mass, airborne substances, and the like.

It is commonplace to measure and record the gross or absolute air flow past a point, either in terms of air velocity or actual flow; it is also common to measure the horizontal component only of air flow, and its direction in azimuth. A much more difficult problem is the detection and measurement of the vertical component only of air flow. While proposals have been advanced for the making of such measurements, all of these of which we are aware have serious drawbacks. Thus, in the absence of what might be called an absolute or directly-indicating vertical air sensor, elaborate equipment and complicated conversion techniques are required to reduce the measured data to useful form. These measures prohibit widespread use of such proposals, both because the expense and complication are not conducive to field installations, and because the reduction of large amounts of data to useful form presently requires excessive computation by operating personnel.

While it might appear that the measurement of vertical air flow merely requires suitable orientation of known sensors such as are used for horizontal flow purposes, a little thought will show (and experience confirms) that the problems are entirely distinct. Thus, while horizontal wind may vary in azimuth from instant to instant, it rarely if ever suffers the complete reversal of direction that is a characteristic feature of vertical flows. The vertical flow may change from "up" to "down" at very short intervals, such as a fraction of a second, and these changes greatly affect the time-average or net vertical flow; even though the flow in the respective directions persists for only such short intervals.

It is accordingly a principal object of this invention to provide methods and apparatus for the precise registration or recording of the vertical components of air flow, and of any measurable quantities associated with such flow.

A further object of the invention is to provide apparatus as above which will be relatively inexpensive and simple to use, and of compact, convenient remote-indicating form, well adapted for field use in any terrain or climatological environment.

Still another object of the invention is to provide apparatus of this type whose response characteristics will be substantially linear and directly indicative of the measured quantities, so as to minimize or even eliminate subsequent data-reduction operations.

Yet another object is to provide apparatus for the measurmenet of the vertical transport of properties of the air, such as sensible heat or momentum, or materials in it, such as moisture, ozone, radon, carbon dioxide and so on, and which will distinguish between the properties or substances which are entering the air from the soil or surface, and those which were already present in the arriving air.

Briefly, the above and other objects of the invention are accomplished by certain combinations including a novel vertical-wind sensor having a strictly linear response within the range of vertical angles of interest, and whose response is perfectly symmetrical as between upward and downward flows; yet such as will furnish a direct indication of "sense" (up or down direction), and which is non-responsive to horizontal wind. A typical sensor consists of a delicately sensitive rotor assembly having a plurality of symmetrical vanes mounted on a vertical shaft, together with a rotation- and direction-responsive photoelectric read-out device or transducer which imposes no mechanical restraints on the shaft or rotor. The satisfactory attainment of such a sensor opens the way not only to precise metering of the vertical wind, but provides, in combination with certain auxiliary equipment, for the direct indication or recording of the gross vertical flow not only of air as such, but (with auxiliary sensors) of the other parameters mentioned above.

The invention itself will best be understood by referring now to the following detailed specification of certain illustrative embodiments thereof (given by way of instruction and example and not for purposes of limitation), and to the accompanying drawings, in which:

FIG. 4 is a schematic diagram of a complete apparatus for registering the respective upward and downward flows over a desired time interval.

FIG. 5 is a circuit diagram of one of the photocell amplifiers of FIG. 4.

FIG. 6 is a diagram showing the action of multi-apertured transducer shutter as described herein.

FIG. 7 is a schematic diagram of an installation of the novel sensor for making a permanent record of both upward and downward air flow from instant to instant.

*Introduction*

Figure 1:
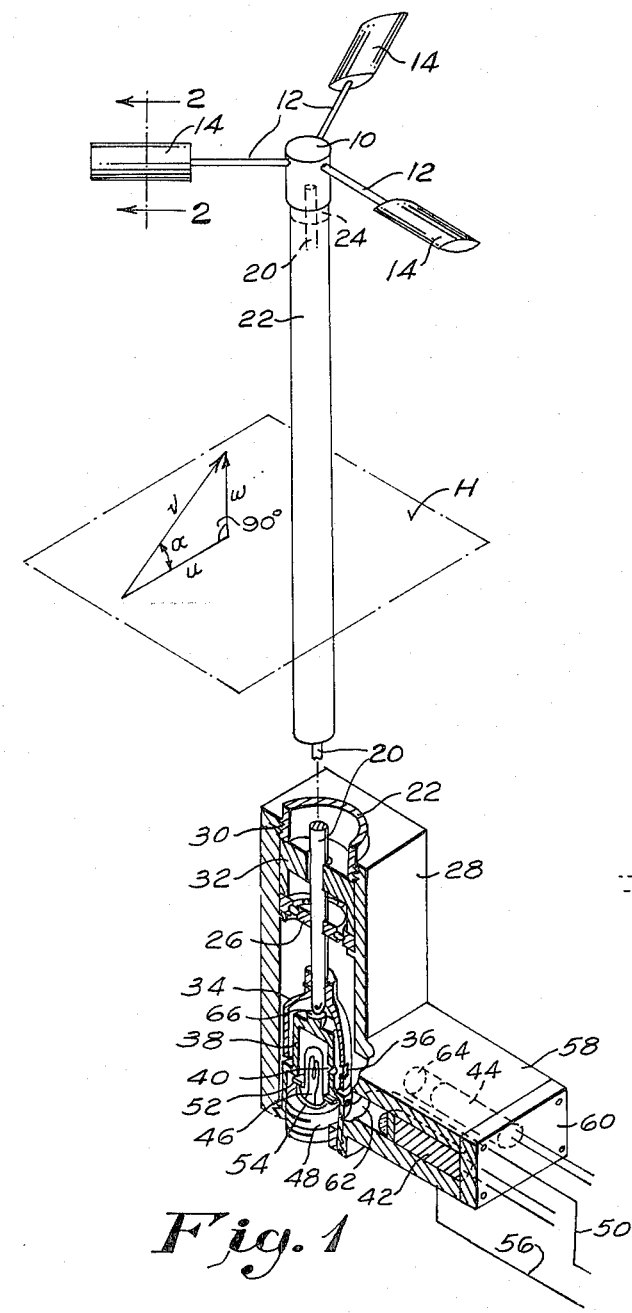
FIG. 1 is a perspective, partly diagrammatic view of a complete vertical-wind sensor in accordance with the invention, with the read-out or transducer portion shown to a larger scale and with parts thereof broken away for clarity.

FIG. 1 of the drawing not only shows certain mechanical features of the novel sensor, but will serve also to elucidate its underlying principle of operation. The figure shows, superimposed on the sensor assembly, a section of a horizontal plane H outlined in phantom lines. The wind direction at the instant under consideration is represented by the vector $v$, whose length represents the absolute magnitude or velocity thereof. It will be seen that the horizontal component of the wind $v$ has the value represented by the vector $u$, being the projection on plane H of vector $v$. As expected, the direction (in azimuth) of projection $u$ establishes the conventional wind "direction" of weather reports.

However, it will be noted that changes in the vertical direction of the wind $v$ can readily alter the directional sense (up or down) of the vertical wind component $w$; the latter being the projection of vector $v$ on a vertical plane; and this even for a stationary azimuth-angle of vector $u$. In the right triangle shown, the vertical angle of the wind will be called the "angle of attack" or $\alpha$. The vertical component $w$, including a representation of its sign or sense (up or down) is the basic parameter measured by the present invention. It is apparent from the diagram that $$\sin \alpha = w/v \quad (1)$$

or $$w = v \sin \alpha \quad (2)$$

If the output of the sensor when subjected to the wind $v$ is proportional to the rate of rotation of the vane assembly and its shaft, in (say) revolutions per second, and this rate is called $Pc$, then $$APc = v \sin \alpha \quad (3)$$

where $A$ is the proportionality constant characteristic of the sensor design and is readily determinable. Then, since (from Equation 2)

$$v \sin \alpha = w$$

$$APc = v \sin \alpha = w \quad (4)$$

or $$APc = w \quad (5)$$

Therefore an ideal sensor-transmitter should respond according to Equation 4; that is, the output will be proportional to the vertical component $w$ if the instrument responds at a rate proportional to the product of $v$ and the sine of the angle of attack $\alpha$.

Vertical wind sensor

Figure 2:
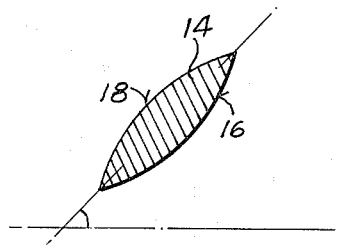
FIG. 2 is a sectional view through one vane of the sensing unit, taken along line 2—2 of FIG. 1.

A sensor having precisely this property is illustrated in FIGS. 1 and 2 of the drawings. It consists of a central hub 10 having three light but rigid arms 12 spaced at 120 degree intervals and all in the horizontal plane. Each arm 12 carries a vane 14 of uniform and symmetrical lenticular cross section as better shown in FIG. 2; the boundaries of the section as presently utilized are cylindrical segments 16, 18 both of a radius approximately equal to the chord (length of sectioned part) in FIG. 2. A typical and suitable set of proportions is found to be: radius of arcs, ⅞"; chord, ⅞"; length of each vane 1¾"; overall length of vane and arm 12, about 2". However, there is no reason to suppose that these dimensions and proportions cannot be varied without losing the benefits of the invention. As shown, all of the vanes have their major chords at 45 degrees to the horizontal.

It should be noted in passing that an air screw or propeller-like cane unit, as heretofore proposed for vertical wind sensing, suffers from major defects. Its response rate is not proportional to the sine of the attack angle, and is not the same for identical up- and down-drafts.

The vane assembly is mounted by hub 10 upon a slender vertical shaft 20 housed within a stationary tubular casing 22 of adequate length to reduce interference, with the flow, by the read-out or transducer parts below the vanes. A miniature anti-friction bearing 24 near the top of casing 22 maintains the shaft in a vertical position, and a similar bearing 26 is positioned within the transducer housing 28 in an orifice wherein the lower end of casing 22 may be threadedly secured as at 30. A seal or bushing 32 serves to secure bearing 26 against a flange or shoulder in housing 28.

Sensor output transducer

At its lower end, the shaft or spindle 20 has secured thereto a hollow open-bottom opaque shutter 34 of cup-like shape, and having a hole 36 in its side wall. Within this cup 34 is positioned a lamp housing 38, also opaque, and having an aperture 40 in its side wall, positioned to align with hole 36 once during each revolution of cup 34 and shaft 20. Lamp housing 38 is secured in position in a downwardly open bore of housing 28, with its aperture directed towards a pair of photocells 42, 44 such as miniature cadmium sulfide cells of commercial type. The lamp 46 may be secured in lamp housing 38 as by a threaded base 48, one lamp circuit conductor 50 being threaded through a hole in the housing 38 and connected to a contact ring 52 (otherwise insulated from the body of housing 28) against which the base 48 presses a contact coil spring 54. The other lamp circuit conductor 56 may be connected to the metallic housing 28.

Photocells 42 and 44 are received in bores within a side arm 58 of housing 28, and secured therein by cover plate 60. Each bore defines a window (as at 62, 64) aimed at the direction from which light passes from lamp 46, through aperture 40 (and hole 36 of the shutter cup, when in position) to the respective photocell. It is clear that when cup 34 rotates, the cells 42 and 44 will be energized in sequence, the order of such energization depending on the direction of rotation of shaft 20.

To provide a rugged and dependable thrust bearing for shaft 20 and its connected parts, the lower extremity of the shaft is allowed to project slightly within cup shutter 34, and is rounded (and hardened) to bear upon a hardened, polished flat 66 at the top of lamp housing 38. Since the light-beam position transducer imposes no restraint on the vane assembly, and since the latter need weigh only a few grams, a high sensitivity to vertical air flow is realized. At the same time, the device is utterly insensitive to horizontal components from any direction.

Sensor linearity

Figure 3:
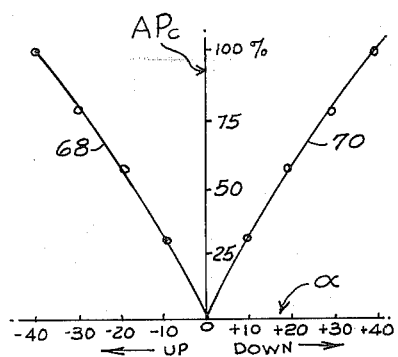
FIG. 3 is a typical response curve of the output of the novel sensor, plotted as the percentage of the maximum useful output (i.e., or attack angles of $+$ and $-40$ degrees), obtained for various smaller values of the attack angle.

The precision with which a sensor as described satisfies the linearity requirement is best illustrated in the graph of FIG. 3 of the drawings, in which values of $APc$ are plotted as ordinates, against the angle of attack ($\alpha$) for values of the latter ranging from $-40$ degrees of angle to $+40$ degrees (the sign indicating "up" and "down" winds respectively). The solid line curves 68 and 70 are the true values of $APc$ calculated from Formula 4 above, and the circled points are experimental values as measured with the sensor. It will be observed that the experimental points fall closely along the curves, and the sensor's response characteristic is therefore linear within the range indicated, and is symmetrical for the up and down directions. The 100% value of $APc$ has been arbitrarily adjusted to the output at a 40 degree angle, as greater angles of wind flow are of little practical significance to the problems.

Counting of output pulses

Since the sensing vane assembly actually senses the vertical motion of the surrounding air, it would be a mistake to consider the device as just described to be merely a velocity sensor. Actually, each full rotation of the vanes will represent the vertical motion of an air layer of a certain thickness; ten centimeters, for example. To obtain the total upward or downward flow over a period of time, or to record the corresponding flow values, it is sufficient to count the number of rotations of the shaft in the respective directions. However (and here there must be considered a significant difference from conventional horizontal-wind anemometers), in the case of vertical flow there may be very short-period fluctuations from the up to down directions. This happens, for example, where the prevailing wind is principally horizontal, so that small and perhaps random changes in vertical direction occur as a result of gusts, eddies and the like.

If a conventional di-directional counting scheme were employed, a change of the air motion from up to down, regardless of the interval during which each direction was maintained, would register a count; this is because conventional pulse counters register a count upon any change from a finite value to a zero value, and the air displacement in going from "up" to "down" necessarily passes through a zero-output value. If the accuracy or resolution of the instrument as designed is (say) to be kept within an error equivalent to one full rotation of shaft 22, a succession of direction-reversals interspersed among partial-turn rotations of the shaft may well accumulate a significant error in the relationship of the up-counts and down-counts. The invention overcomes this objection by employing, in combination with a sensor as described, a counter scheme which ignores such "false counts," and it does this without complicating the construction of the sensor assembly itself, and by very simple external circuitry.

FIG. 4 illustrates schematically certain major parts of the sensor as already described, together with the counting circuitry just referred to above. Thus, lamp 46, lamp housing 38 (with hole 40) and shutter 34 (with hole 36) are shown at the bottom of the figure, as are photocells 42 and 44. The outputs of the photocells are connected to respective amplifiers 72 and 74 to raise the available current to values suitable for the operation of relays of reasonable sensitivity. For practical reasons not related to the essential novelty, it is preferred to arrange the amplifiers so that they furnish a specified direct current output when the corresponding photocell is not energized, the amplifier outputs falling to zero whenever the corresponding photocell is energized by light from lamp 46. For example, FIG. 4 illustrates the condition when cell 42 is exposed to light by the shutter aperture 36, thus energizing the input of amplifier 72 and causing its output to be zero, or substantially so. The winding of each relay 76, 78 is connected through the "normally closed" or back contact 80, 82 of the other relay and thence to the respective amplifier outputs. Since cell 42 is illuminated, amplifier 72 has no output and relay 78 therefore cannot be energized in any event. Moreover, since cell 44 is not illuminated, its amplifier 74 is supplying its design output current, which flows through the back contact 82 of relay 78 and energizes relay 76, whose back contact 80 therefore opens, and whose front contact 84 closes, as shown. Since the amplifier 72 has no output at this time, relay 90 (now connected to the output conductors of amplifier 72) remains de-energized. However, relay 88 is equipped with a holding circuit to be described, as is relay 90, so that one of relays 88 and 90 is always in its energized condition so long as there is output from either amplifier. Zero output from both amplifiers can only occur when both cells 42 and 44 are illuminated, and this will occur in FIG. 4 when shutter 34 makes a small turn in the updraft direction indicated by the arrow and legend. Considering that this partial turn has actually occurred, and relays 76 and 88 have released, the sequence of operation is as follows:

Condition (1): Both cells illuminated; no amplifier output, all relays and the coils of pulse counters 92 and 94 de-energized.

Condition (2): Cell 42 dark, cell 44 light; amplifier 72 has output, and since contacts 80 are then closed, relay 78 operates and closes its front contacts 96, but relay 88 does not operate since amplifier 74 has no output.

Condition (3): Both cells are dark (due to further rotation of shutter 34); both amplifiers have output current, relay 78 remains energized, and its contacts 96 apply current from amplifier 74 to relay 88 over direct leads 98 and 100. The energizing (stepper) coil of electromechanical counter 92, being in parallel with the coil of relay 88, is also energized and registers one count on the updraft counter. Also, the normally-open contacts 102 of relay 88 become closed, completing a holding circuit for relay 88 over those contacts and conductor 104 to the lower output lead of amplifier 74. This circuit includes a diode 106 which is poled to conduct the output current of amplifier 74.

Condition (4): After nearly a complete turn of shutter 34 in the updraft direction, cell 42 again becomes illuminated, cell 44 remaining dark. The output of amplifier 72 becomes zero, and relay 78 releases, opening contacts 96; relay 88 remains energized due to the holding circuit and its own contacts 102. The updraft counter 92 has its coil still energized, so the count already recorded under condition (3) will not be increased until conditions (1) and (2) are repeated.

Continued rotation of the shutter 34 in the updraft direction will produce an added count of one in counter 92 for each complete revolution. The operation for complete turns in the downdraft direction is precisely similar, with relays 90 and 76 taking the parts formerly played by 88 and 78. The diodes 106 and 108 are reversely poled, so that neither of relays 88 and 90 will be held in its operated condition due to current flow from the opposite amplifier.

The case in which there are repeated fractional turns of the shaft 20 in opposite directions, but none of such magnitude as to cause a count registration, will now be considered. This occurs, as already indicated, mainly at times of pure horizontal wind flow with slight changes in azimuth occurring for short periods only. It has been shown that the up register 92 counts only when cells 42 is dark before 44, and the down register 94 counts only when 44 is dark before 42. In the case where 44 refains dark during reversals in rotation of the shutter, but 42 becomes alternately light and dark, review of conditions (3) and (4) above for the updraft sequence shows that the up counter 92 will register during condition (3) but its coil will remain energized throughout any number of light and dark conditions of cell 42, so long as cell 44 remains dark. Therefore, because the system is not measuring the small angular movements of the shaft, it is not adding any false counts during the period.

In the same manner, the system will not add false counts when cell 42 remains in the dark condition and cell 44 becomes alternately dark and light. Again, once condition (3) has been achieved, a reversal to condition (2) will not de-energize the counter. It is to be understood that the counters are of the pawl and ratchet type, or equivalent, in which an armature or the like must be pulled up to effect a registration, and released in preparation for another registration; or they may be of the type in which the registration is effected only upon release of the armature. Equivalent purely electronic counters (such as counting rings) may also be employed.

A different effect from fractional rotation occurs when one photocell, say 44, remains in the light condition and the other cell (42) alternates between light and dark. With standard switching circuitry as employed in prior art counters, false counts would be added even during very small angular movements of the shutter under such conditions. By proportioning the sizes of apertures 36 and 40, and thus setting an angular limit to the rotation of the shutter within which one cell can become either light or dark while the other remains in one condition, the insensitivity of the counter to such false counts can be controlled. The actual limits will depend upon the effective size of the light beam from source 46, taking into account the parallax effect due to the radial displacement of apertures 36 and 40 from that source. An angle of 65 degrees for this limit has been found appropriate for the applications disclosed herein.

*Average-value outputs*

From the foregoing, it will be apparent that the instrument as described yields the time-average values of the upward and downward vertical components; each revolution of shaft 20 represents the passage of a definite "length of travel" of the air in the vertical direction, whence:

$$\overline{w} = APc/T$$

where T is the time period.

FIG. 5 illustrates, merely for the sake of completeness, a typical form which amplifiers 72 and 74 may take. The output current at leads 110 is supplied from a 12-volt battery through the emitter-collector path of transistor 112. The 1.5-volt battery connected through a resistor 114 insures that output current 110 will fall to zero. When transistor 118 conducts, as it will when base current is supplied thereto through the photocell connected to the input terminals, the resistor 116 (for establishing the input turn-off threshold or sensitivity) conducts a current biasing the base of transistor 112. The resistor in series with the 12-volt battery merely serves to limit the full output current to the desired value for operating the relays and counters.

Instantaneous-value outputs

With slight modifications, the same instruments can be employed to indicate and record the instantaneous value of the vertical wind component, rather than its time-average. This can be done as shown in FIG. 6 by providing the shutter with a multiplicity of openings, as indicated schematically at 120, the shutter in this case being designated 34'. Since pulses will be emitted continuously during even fractional turns of the shutter, the recurrence frequency of these pulses will be proportional to the velocity of air travel. In order to preserve the directional or sense-control, the lamp house 38' now is provided with two separate holes or apertures 122, 124, respectively directed to the cells 42 and 44. It is evident from the drawing that the identical sequences of photocell "conditions of light" as described above will characterize the operation of this form of the invention.

Up-down air flow recording

FIG. 7 of the drawings shows an application of the instantaneous velocity reading instrument to a recording type of apparatus in which a known form of paper-tape recorder 126, driven by clockwork as to the paper travel, is used to record on the right and left sides of a medium line the respective instantaneous up and down velocities. The photocells 42 and 44 are energized in sequence by a multi-aperture shutter such as in FIG. 6, and the outputs of their respective amplifiers operate the up-down switch circuit 128 just as before (that is, circuit 128 here designates the same arrangement of four relays and two diodes as in FIG. 4), but the respective outputs of the switch circuit do not operate respective counters. Instead, these outputs are supplied over conductors 130 and 132 to respective operating coils of a latching type relay 134 whose contact-set 136 operates as a pole-changer or polarity-reverser for the output of a ratemeter 138. A centering or detent spring 140 (a snap-action leaf may be substituted) retains the contacts in the position to which they were last shifted upon any momentary energization of the respective coils 142, 144. Since one or the other of leads 130 and 132 will be energized upon each reversal of wind direction from up to down, and vice versa, the result is that the polarity of the voltage applied to the zero-center recorder movement 146 will be dependent upon whether an updraft or a downdraft is currently being measured.

The magnitude of the voltage applied to recorder movement 146 is determined very simply by converting the recurrence-frequency of pulses from either one of photocells 42 and 44 to a direct-current voltage which is proportional to that frequency. Thus, in FIG. 7, cell 44 has been chosen for this purpose, and its output is applied to an auxiliary amplifier 148 through a wave shaper 150 (to standardize the pulse form and amplitude, and thus to eliminate any undesired effects of amplitude changes, since only the recurrence frequency is of interest). The pure recurrence-frequency information in pulse form, from shaper or limiter 150, is applied to the ratemeter 138, which may be of the same type as any low-frequency FM discriminator, yielding a varying D.C. output proportional to the pulse recurrence rate, and of fixed polarity.

Up-down flux recording

The foregoing descriptions deal with the measurement, registration and recording of the vertical wind flow, or flow velocity. For the purpose of recording what has been termed the "flux" of various quantities associated with vertical air movements, a modified form of the apparatus is disclosed in FIG. 8 of the drawings.

Figure 8:
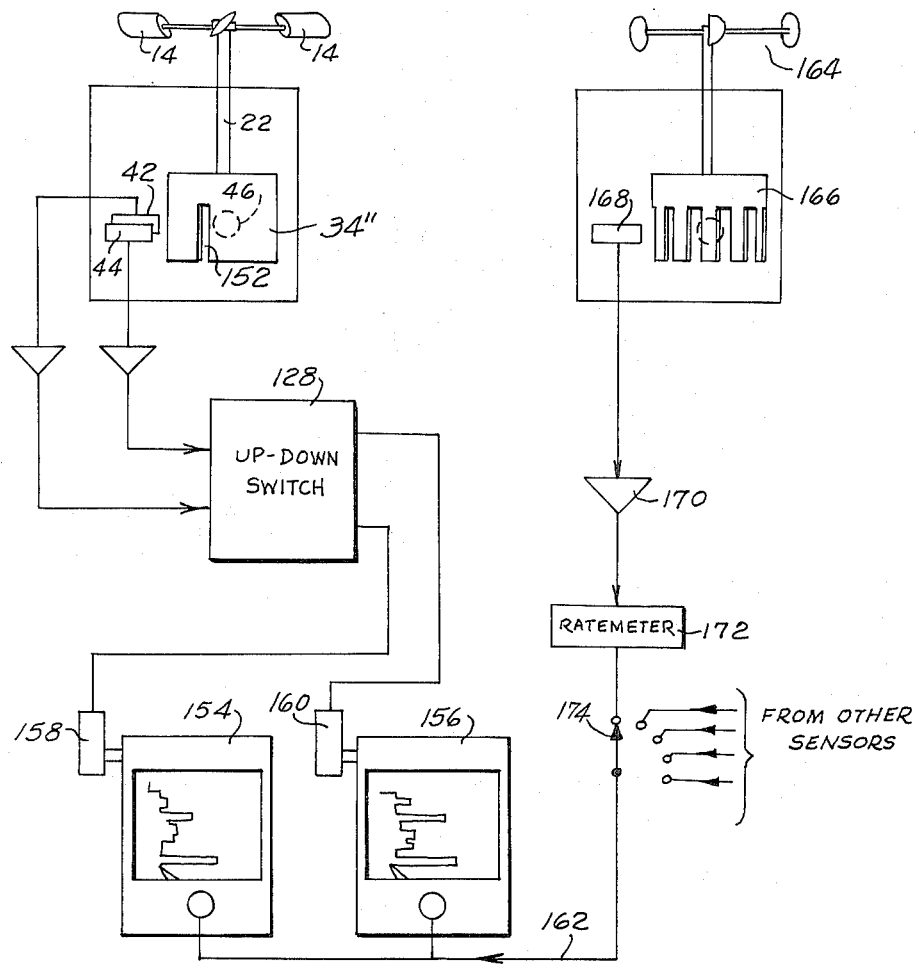
FIG. 8 is a further schematic diagram of the application of the new sensor and its output system to the recording of the upward and downward flux of other quantities than simple air flow.

In FIG. 8, the novel vane-type sensor and general metering arrangement are as described in connection with FIG. 4, with certain changes. Where the same elements are involved, they are left un-numbered or are given the same numbers as earlier employed. Thus, the vane assembly for vertical flow measurement is unchanged (vanes 14, tubular casing 22), but a multi-apertured shutter 34" is employed, to illustrate the mechanical variant employing a slot 152 instead of a hole as earlier described. Cells 42, 44 and their amplifiers again control an up-down switching circuit 128 (like or equivalent to the four relays and diodes of FIG. 4), but in this instance the two outputs of this circuit serve to effect respective measured steps of motion of the recording paper of the recorders 154, 156, upon each reversal of flow direction. These outputs may thus energize the respective electromagnetic ratchet drives 158, 160 for the paper feeds of the recorders, an increment of feed being given to the paper in the respective recorder for each rotation of the vane assembly, and all of the "up" increments serving to feed paper in one recorder (such as 154) while all of the "down" increments feed the paper in the other recorder. As each feed increment occurs, the striker bar or marker of each recorder is also energized momentarily to produce the record trace.

The value of the other quantity which, when integrated with reference to the vertical wind flow, will yield the desired flux measurement, is applied to both of the recorder movements of the recorders, as indicated by the channel 162. For example, if the so-called "momentum" flux is to be recorded, the horizontal component of wind velocity will be used to control the recorder pen or marker displacements. FIG. 8 illustrates this by means of the conventional light cup anemometer 164 driving the multiple-slotted shutter cup 166 and thus producing output pulses from photocell 168 in proportion to the horizontal wind velocity. These pulses are amplified and shaped as at 170, and applied to the ratemeter or discriminator 172, which furnishes signals to both of the recorder movements over channel 162.

To understand the concept of momentum flux, it is necessary to appreciate that the ascending and descending layers of air also have horizontal components of velocity. Since the winds aloft are usually stronger than those near the ground, the descending air is moving faster horizontally and has a greater momentum than the rising air. Thus, there is usually a net downward flux of momentum. In FIG. 8, the two recorders both record the horizontal velocity component, but one is recording that parameter for rising air, the other for descending air. Knowing the density of air, the momentum transferred upward and downward can be obtained simply by measuring the areas under the curves drawn on the two recorder charts. The two sensors would normally be mounted aloft, as upon a mast over the terrain or location at which the measurements are wanted, and spaced so as not to produce any mutual interference with respect to the wind currents.

In a similar manner the flux of heat, moisture or other variable quantities can be obtained. All that is required is to supply to the channel 162 a voltage indicative of the magnitude of the quantity as it varies from instant to instant. For temperatures (heat flux) the sensor 164 would merely be replaced (along with its rate-producing auxiliaries 170 and 172) by a sensitive and fast-response temperature registering device having either an electric output signal, or an output signal convertible to an electric signal for ready application to channel 162. A thermocouple or resistance thermometer would be adaptable for the purpose. Knowing the specific heat of air, the chart records can readily be converted to the net quantity of sensible heat transported upward or downward, again by measuring the areas under the two charts and subtracting. In the case of moisture flux, the sensor replacing anemometer 164 would be an absolute humidity gauge. Similarly, gas-content apparatus would be employed to obtain the transfer of $CO_2$, randon (as by radioactivity sensing) and the like.

Where sensors of sufficiently fast response are not available, or when for any reason their use is proscribed, the same ultimate results can be obtained by the use of sampling pumps, one for sampling the up-going air and the other for sampling the down-going air. The pumps are made to operate at the same rate as the vertical wind vane turns so that representative samples are obtained. The concentration of the substance in the samples can then be measured at leisure, and the flux determined by multiplying by the quantity of air moved up and down.

FIG. 8 indicates at 174 a multi-position switch by which, for example, any of several different quantity-sensors, such as those just discussed, could be selectively applied to the channel 162, to yield a highly versatile instrument for field use. The same showing is intended as an indication of the manner in which any selected sensor can be connected to the apparatus to provide the flux measurements desired, whether or not a plurality of such sensors are made available at one time.

It will be understood by those skilled in instrumentation that while we have discussed and illustrated relay-type circuits for performing the switch operations, and physical recorders for integration of variables, purely electronic equivalent arrangements for such purposes can be used, and may offer compensating advantages in some instances. We do not mean to exclude such equivalents from the scope of our invention.

While the invention has been described in considerable detail, so as to enable those skilled in this art to use the same, the details given are not intended to constitute limitations on the scope of the invention, except as may be required by the scope of the appended claims.

What is claimed is:

1. A vertical air flow sensor for measuring the vertical component only of the natural wind, independently of its horizontal flow, comprising a rotatable shaft, means securing said shaft with its rotational axis in a fixed vertical position, an open vane structure secured to the upper end of said shaft, said vane structure comprising a plurality of horizontal radial vanes equally spaced about said shaft, each vane having a cross-section of symmetrical lenticular shape with its major chord lying at a 45 degree angle to the vertical direction, and means for registering both the amount and the direction of rotation of said vane structure in response to such vertical component of the natural wind.

2. A wind sensor in accordance with claim 1, in which said registering means comprises an apertured shutter rotatable with said vane structure, a pair of photocells displaced in azimuth about the axis of rotation of said shutter for sequential occlusion thereby, and means for separately registering the output impulses from said photocells.

3. A vertical wind sensor for measuring the vertical component of the natural wind, comprising a vertical pivot, a vane structure on said pivot having a symmetrical motion-response for upward and downward air flow, said response being strictly proportional to the vertical components of air motion past said vane structure; said vane structure comprising a plurality of vanes having a cross section of symmetrical lenticular shape with its major chord lying at a 45 degree angle to the vertical direction; means for registering both the amount and direction of rotation of said vane structure in response to such vertical components, said registering means comprising an apertured shutter rotatable with said vane structure and a pair of photocells displaced in azimuth about the axis of rotation of said shutter for sequential occlusion thereby, and means for separately registering the output pulses from said photocells; said last-named means including means for suppressing the registration of succeeding output pulses from each individual photocell, following a first output pulse therefrom of a series, in the absence of an intervening pulse from the other photocell.

4. In meteorogical apparatus, the combination of means providing two alternate series of output pulses occurring at rates respectively proportional to the upward and downward components of natural wind flow at a measuring station, a pair of recorders each including means for moving a record medium and means for recording on said medium a variable parameter, switching means controlled by said pulse series for sequentially energizing the record-moving means of said recorders by amounts proportional to the number of pulses in the respective series of pulses, means for deriving a signal indicative of the magnitude of a quantity associated with the vertical air motion at said station, and means for energizing the recording means of both said recorders in response to said signal.

5. The method of measuring, at a measuring station, the vertical flux of a meteorologically significant quantity such as the heat content, moisture content, gas content or momentum flux of atmospheric air, comprising the steps of continuously measuring the vertically upward and downward components only of natural air flow at said station, continuously and simultaneously measuring the instantaneous magnitude of said meteorologically significant quantity at said station, and continuously recording the said magnitude and the instantaneous value of said vertical air flow as an integrated product.

References Cited by the Examiner

UNITED STATES PATENTS

| | | | |
|---|---|---|---|
| 1,852,414 | 4/32 | Hoff | 73—185 |
| 2,346,864 | 4/44 | Packard | 73—229 |
| 2,901,173 | 8/59 | Clicques | 73—194 X |
| 3,094,869 | 6/63 | Wehmann | 73—189 |

FOREIGN PATENTS

| | | |
|---|---|---|
| 753,839 | 8/33 | France. |

RICHARD C. QUEISSER, *Primary Examiner.*

JOHN P. BEAUCHAMP, ROBERT L. EVANS,
*Examiners.*